United States Patent
Matsui et al.

(10) Patent No.: US 8,918,000 B2
(45) Date of Patent: Dec. 23, 2014

(54) RECORDING MATERIAL DETECTION APPARATUS AND IMAGE FORMING APPARATUS

(71) Applicant: Canon Kabushiki Kaisha, Tokyo (JP)

(72) Inventors: Norio Matsui, Mishima (JP); Shoichi Koyama, Susono (JP); Tsutomu Ishida, Suntou-gun (JP); Shun-ichi Ebihara, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/097,039

(22) Filed: Dec. 4, 2013

(65) Prior Publication Data

US 2014/0093260 A1 Apr. 3, 2014

Related U.S. Application Data

(63) Continuation of application No. 13/307,537, filed on Nov. 30, 2011, now Pat. No. 8,626,013.

(30) Foreign Application Priority Data

Dec. 10, 2010 (JP) ................................. 2010-276166

(51) Int. Cl.
G03G 15/00 (2006.01)
(52) U.S. Cl.
CPC .. *G03G 15/5029* (2013.01); *G03G 2215/00738* (2013.01); *G03G 2215/00751* (2013.01)
USPC ............................................ 399/45; 399/73

(58) Field of Classification Search
CPC ..................... G03G 15/556; G03G 15/5041
USPC ................................................ 399/45, 73, 74
See application file for complete search history.

(56) References Cited

FOREIGN PATENT DOCUMENTS

| JP | 01-099187 | * | 4/1989 |
| JP | 2010-220025 A | | 9/2010 |
| JP | 2010-266432 | * | 11/2010 |

* cited by examiner

*Primary Examiner* — Walter L Lindsay, Jr.
*Assistant Examiner* — Barnabas Fekete
(74) *Attorney, Agent, or Firm* — Canon USA, Inc., IP Division

(57) ABSTRACT

A recording material detection apparatus having a detecting device configured to detect a surface state of a recording material on the basis of reflected light from a surface of the recording material includes a reference surface to be irradiated with light from a light source, the detecting device includes a light-shielding portion configured to control conditions for detecting information relating to the surface state of the recording material on the basis of the reflected surface from the reference surface, and cover a portion of the reference panel other than the reference surface so as to prevent the light from the light source from being reflected from the portion of the reference panel other than the reference surface and being received by the light-receiving unit.

18 Claims, 10 Drawing Sheets

US 8,918,000 B2

RECORDING MATERIAL DETECTION APPARATUS AND IMAGE FORMING APPARATUS

CROSS REFERENCE OF RELATED APPLICATIONS

This application is a Continuation of U.S. patent application Ser. No. 13/307,537 filed on Nov. 30, 2011 which claims the benefit of Japanese Patent Application No. 2010-276166 filed Dec. 10, 2010, which is hereby incorporated by reference herein in its entirety.

BACKGROUND OF THE INVENTION

1. Field of the Invention

The present invention relates to a recording material detection apparatus configured to detect a surface state of a recording material by irradiating the recording material with light and an image forming apparatus having such a recording material detection apparatus.

2. Description of the Related Art

Image forming apparatuses such as copying machines or laser beam printers are configured to transfer an developer image(toner image) visualized by a developing device on a recording material under predetermined conditions (for example, transfer biases and recording material conveyance speeds at the time of transfer). Then, by heating and pressurizing the recording medium having the developer image transferred thereon under predetermined fixing conditions (for example, fixing temperatures and recording material conveyance speeds at the time of fixing), the developer image is fixed to the recording material.

There is an image forming apparatus including a recording material detecting unit configured to irradiate a recording material with light from a light source and detect a surface state of the recording medium, and configured to determine the types of recording materials on the basis of the result of detection of the recording material detecting unit and control the transferring conditions and fixing conditions.

Such a recording material detecting unit is capable of detecting the recording material stably by controlling the conditions of detection of the recording materials via an adjustment for achieving irradiation with a stable amount of the light from the light source and a shading correction for correcting unevenness of amount of light on the surface of the recording material. More specifically, the amount-of-light adjustment of the light source and the shading correction are enabled by irradiating a reference panel (white reference) with the light from the light source and detecting reflected light therefrom.

Now, Japanese Patent Laid-Open No. 1-099187 discloses a configuration of a reference panel in which the reference panel is movably arranged on the side of a light-receiving unit with respect to the surface of the recording material (in a unit) and is moved to a reading position when needed in order to avoid the dirt or scratches on the reference panel due to the recording materials being conveyed or dust existing in the periphery thereof.

However, with the reference panel having a movable configuration, the mechanism becomes complicated correspondingly, and an increase in the size of the apparatus and a cost increase are resulted.

SUMMARY OF THE INVENTION

The present invention provides a reduction of a noise caused by reflected light from a portion other than a reference surface of a reference panel and inhibition of a reduction of a range from which an image of a surface of a recording material to be used for determination of the recording material is acquired.

The present invention also provides an image forming apparatus configured to form an image on a recording material including: a light source configured to irradiate a recording material with light; a reference panel having a reference surface to be irradiated with light from the light source, and a light-receiving unit having a plurality of pixels and configured to receive light reflected from a surface of the recording material irradiated with the light from the light source and the reference surface, the reference panel being arranged on the side of the light-receiving unit with respect to part of the surface of the recording material which reflects the light toward the light-receiving unit in the direction orthogonal to the surface of the recording material, and being configured to detect information on a surface state of the recording material on the basis of the reflected light from the surface of the recording material received by the light-receiving unit, control conditions of formation of the image on the recording material, and control conditions of detection of the information on the surface state of the recording material on the basis of the reflected light from the reference surface received by the light-receiving unit, and a light-shielding portion configured to cover a portion of the reference panel other than the reference surface so as to prevent the light from the light source from being reflected from the portion of the reference panel other than the reference surface and being received by the light-receiving unit.

Further features of the present invention will become apparent from the following description of exemplary embodiments with reference to the attached drawings.

DESCRIPTION OF THE EMBODIMENTS

First Embodiment

Image Forming Apparatus

Conventional systems disclose a reference panel in which the reference panel is movably arranged on the side of a light-receiving unit with respect to the surface of the recording material (in a unit) and is moved to a reading position when needed in order to avoid the dirt or scratches on the reference panel due to the recording materials being conveyed or dust existing in the periphery thereof.

However, with the reference panel having a movable configuration, the mechanism becomes complicated correspondingly, and an increase in the size of the apparatus and a cost increase are resulted. Therefore, there is a configuration having the reference panel fixed on the side of the light-receiving unit with respect to the surface of the recording material (within the unit). As an example, a recording material detecting unit in which the reference panel is fixed on the side of the light-receiving unit with respect to the surface of the recording material (within the unit) as shown in FIGS. 7A, 7B, FIG. 9, and FIG. 8 is conceivable.

Figure 7A:
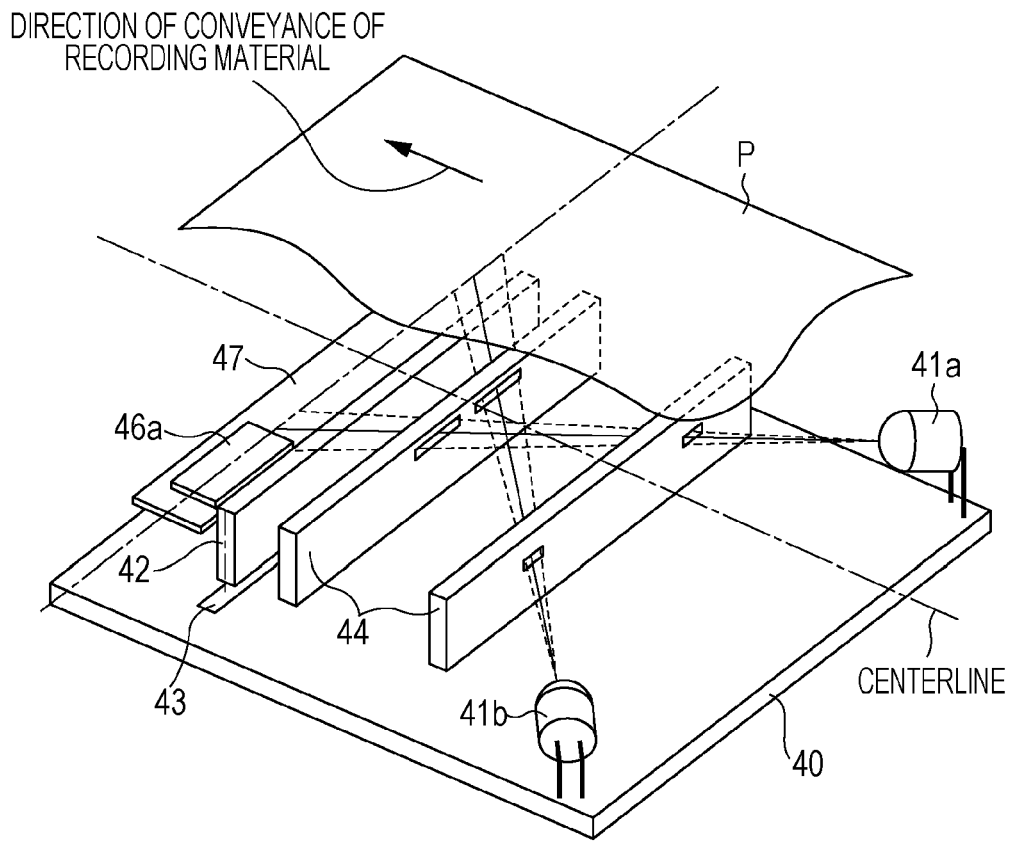
FIG. 7A is a perspective view showing an interior of the recording material detecting unit.
Figure 7B:
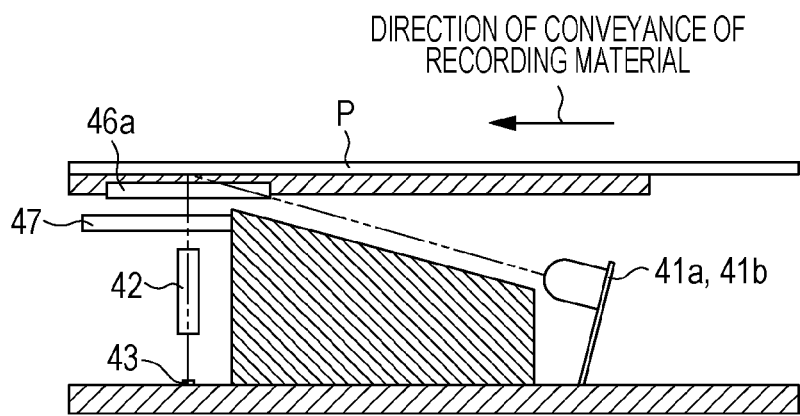
FIG. 7B is a cross-sectional view of the recording material detecting unit viewed from a direction parallel to the surface of a recording material and orthogonal to the direction of conveyance of the recording material.
Figure 9:
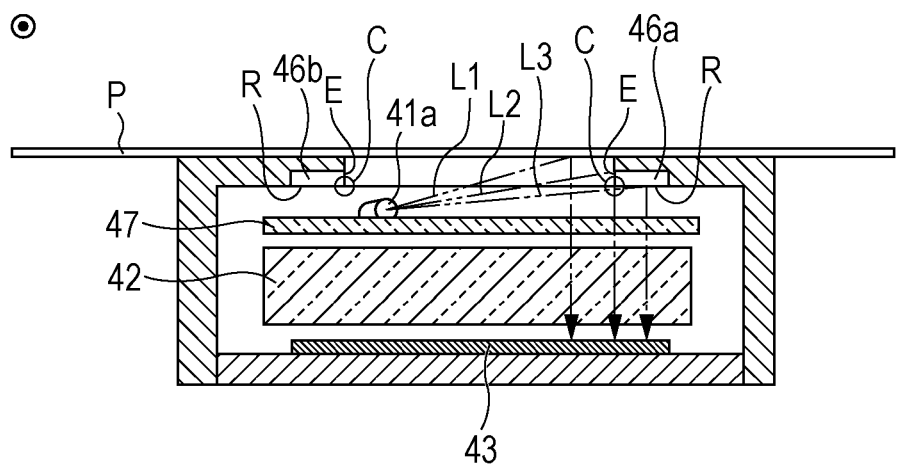
FIG. 9 is a cross-sectional view of the recording material detecting unit viewed from a downstream side in the direction of conveyance of the recording material.

FIG. 7A is a perspective view showing an interior of a recording material detecting unit 40. FIG. 7B is a cross-sectional view of the recording material detecting unit 40 viewed from a direction parallel to the surface of a recording material and orthogonal to the direction of conveyance of the recording material. FIG. 9 is a cross-sectional view of the recording material detecting unit 40 viewed from the downstream side in the direction of conveyance of the recording material.

The recording material detecting unit 40 includes light sources 41a and 41b configured to irradiate a surface of a recording material P with light, an imaging lens 42 configured to form an image by the light reflected from the surface of the recording material P, and a line sensor (light-receiving unit) 43 configured to receive the light of the image formed by the imaging lens 42 and pick up the image. The light emitted from the light sources 41a and 41b are regulated by slits 44. Reference panels 46a and 46b are provided on the side of the light-receiving unit with respect to the surface of the recording material P at ends of an area which is irradiated with the light from the light sources 41a and 41b. Irradiated surfaces of the reference panels 46a and 46b reflect the light from the light sources 41a and 41b toward the imaging lens 42, and the reflected light is received by the line sensor 43, whereby the amount-of-light adjustment and the shading correction are performed and the detecting conditions of the recording material detecting unit are controlled. Provided between the imaging lens 42 and the recording material P is a protecting member 47 configured to protect the imaging lens 42 from becoming dirty and damaged and allow passage of the reflected light from the recording material P therethrough. These members are supported within a unit body. In particular, the reference panels 46a and 46b are attached on a back surface of a portion guiding the conveyance of the recording material P with a double-faced adhesive material or the like. Here, the light sources 41a and 41b are arranged so that not only the surface of the recording material P, but also the reference panels 46a and 46b are irradiated simultaneously with the light from the light sources 41a and 41b. Therefore, the reflected light reflected from the surface of the recording material P and the reflected light reflected from the reference panels 46a and 46b may be received simultaneously by the line sensor 43.

Figure 8:
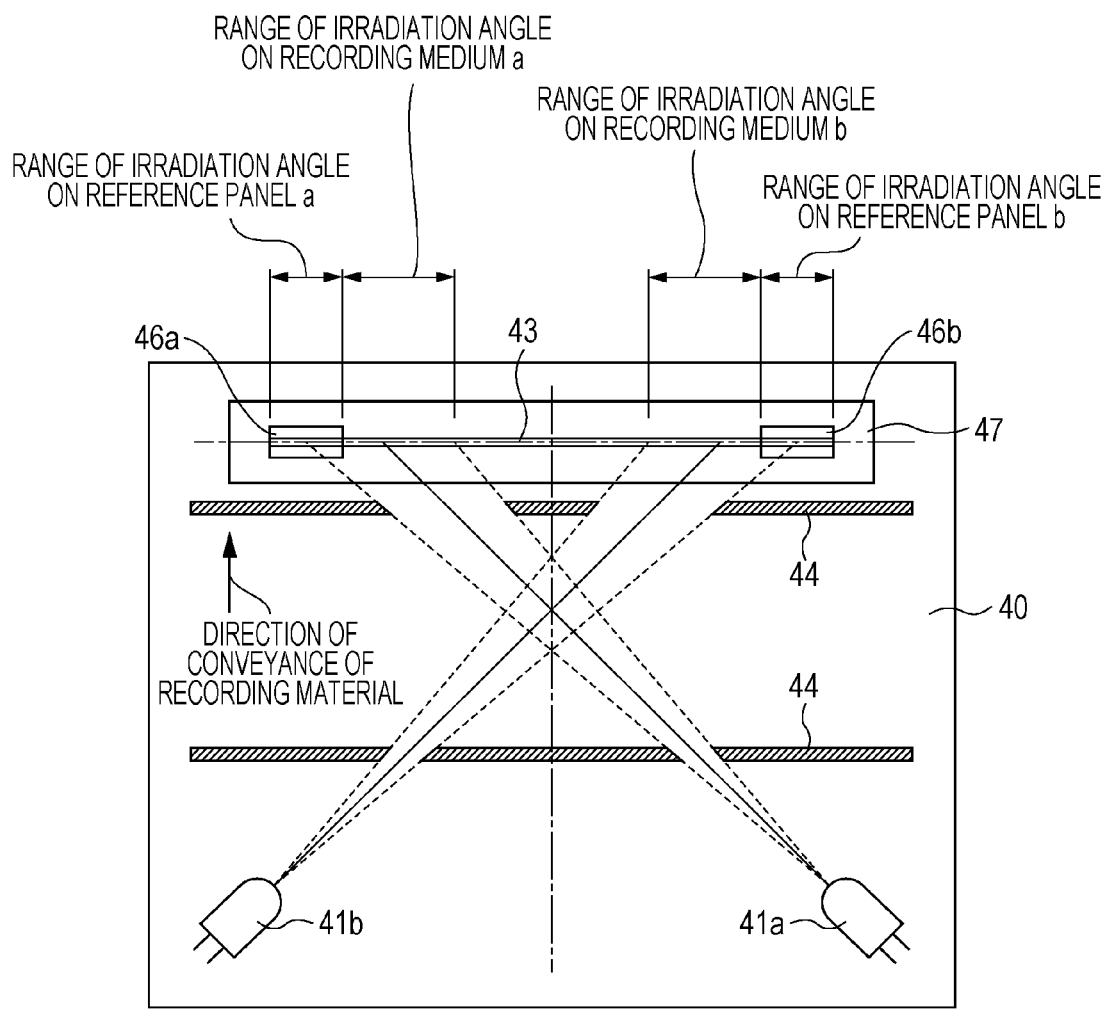
FIG. 8 is a drawing showing the recording material detecting unit viewed from a direction orthogonal to the surface of the recording material.

FIG. 8 is a drawing showing the recording material detecting unit 40 viewed from a direction orthogonal to the surface of the recording material. The longitudinal directions of the imaging lens 42 and the line sensor 43 are arranged so as to be orthogonal to the direction of conveyance of the recording material P. Optical axes of the light sources 41a and 41b are arranged so as to be inclined with respect to the direction of conveyance of the recording material P and to intersect each other. The reference panels 46a and 46b are provided so as to correspond to the light sources 41a and 41b respectively, and are arranged on the outer sides of the optical axes of the light sources 41a and 41b (on the side of the ends of the line sensor 43).

Figure 10:
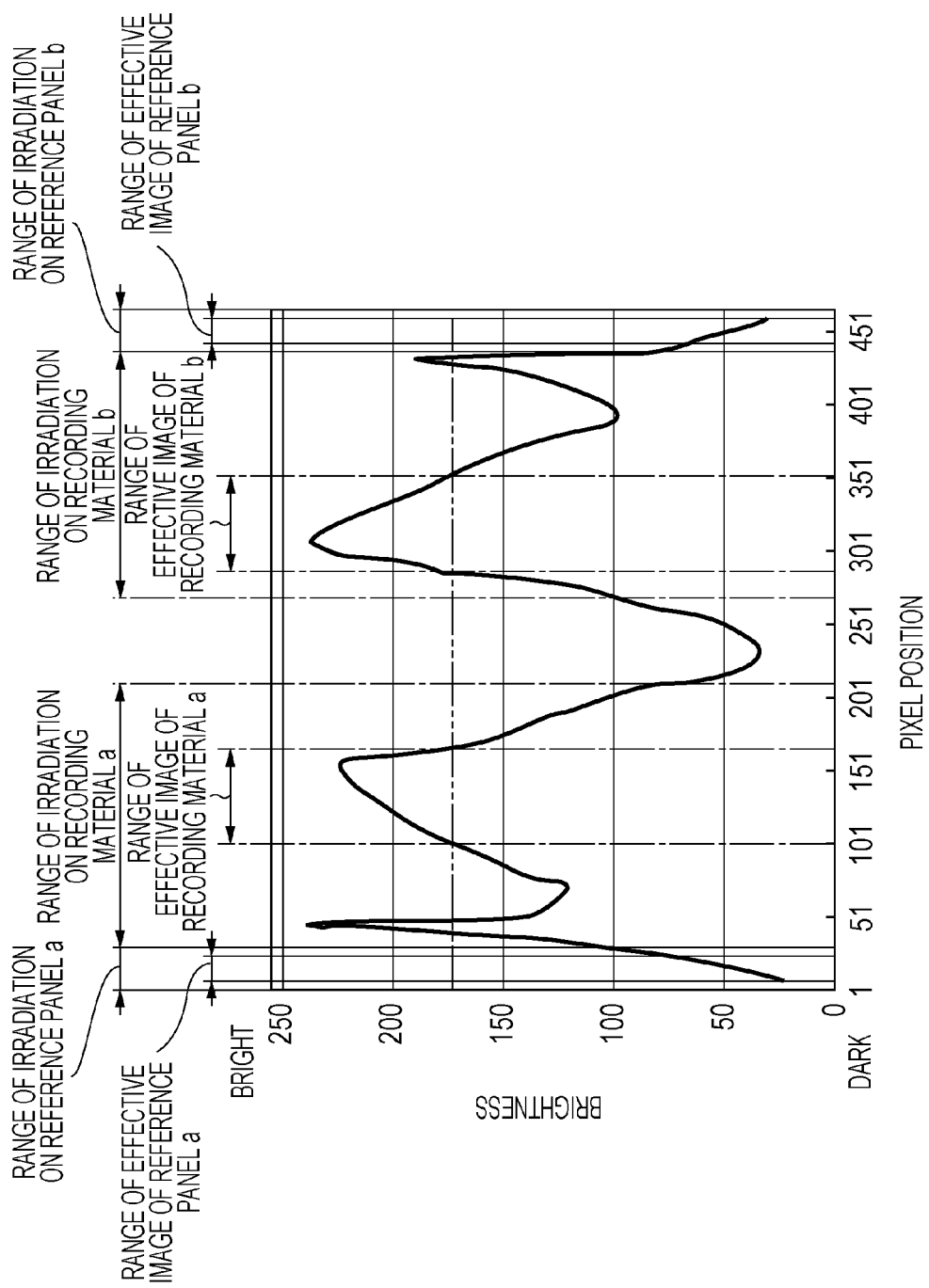
FIG. 10 is a chart showing a distribution of brightness (amount of light) of light received by a receiving unit.

FIG. 10 shows an example of an amount-of-light distribution of light received by the line sensor 43. A lateral axis represents positions on the line sensor 43 corresponding to respective pixels, and a vertical axis represents brightness corresponding to a received amount of light. The pixel position 1 corresponds to a pixel at a left end of the line sensor 43 in FIG. 8, and the corresponding pixel on the line sensor 43 in FIG. 8 goes rightward with an increase in the numerical value of the pixel position. Ranges of irradiation on recording material a and b indicate ranges of a surface image of the recording material to be acquired for being used for determination of the type of the recording material P on the basis of the brightness distribution of the light irradiated from light sources 41a and 41b. Ranges having a brightness exceeding a predetermined threshold value in this amount-of-light distribution are defined as ranges of effective image of the recording material, and the surface images within these ranges of effective image of the recording material are used for the determination of the type of the recording material P. Here, coupling with a minimum duration required for the line sensor 43 to receive the light and the rate of irregular reflection, the threshold value of the brightness is set to 180 in a case where the strength of brightness have 256 tones (0(dark) to 255(bright)). Also, ranges of irradiation on the reference panels a and b on the reference panels 46a and 46b represent areas from which the surface information of reference surfaces R of the respective reference panels 46a and 46b is acquired. The ranges of effective image of the reference panels a and b are areas used for calculating the amount of reflected light from the reference surfaces R. Here, the reference surfaces R of the reference panels 46a and 46b are planes which reflect reference reflected light for performing the amount-of-light adjustment and the shading correction to control the detecting conditions of the recording material detecting unit.

In FIG. 9, an irradiated light irradiated from the light source 41a to the surface of the recording material P is shown in a double-dashed chain line represented by L1, an irradiated light irradiated on an end surface of the reference panel 46a is shown in a double-dashed chain line represented by L2, and an irradiated light irradiated on the reference surface R of the reference panel 46a is shown in a double-dashed chain line represented by L3. As the same goes for the side of the light source 41b, the side of the light source 41a will be described as an representative.

In this manner, the light reflected from an end surface E or an edge portion C between the reference surface R and the end surface E, which are portions of the reference panel 46a other than the reference surface R, enter the range of irradiation on the recording material of the line sensor 43 as a noise component (peaks near the pixel positions 50 and 420 in FIG. 10). Therefore, the range of effective image of the reference panel should be set to a range which can receive sufficient amount of light while avoiding the noise caused by the reflection from the end surface E or the edge portion C, which are the portions of the reference panel 46a other than the reference surface R, so that a reduction of the range of effective image of the recording material is obliged.

Figure 6:
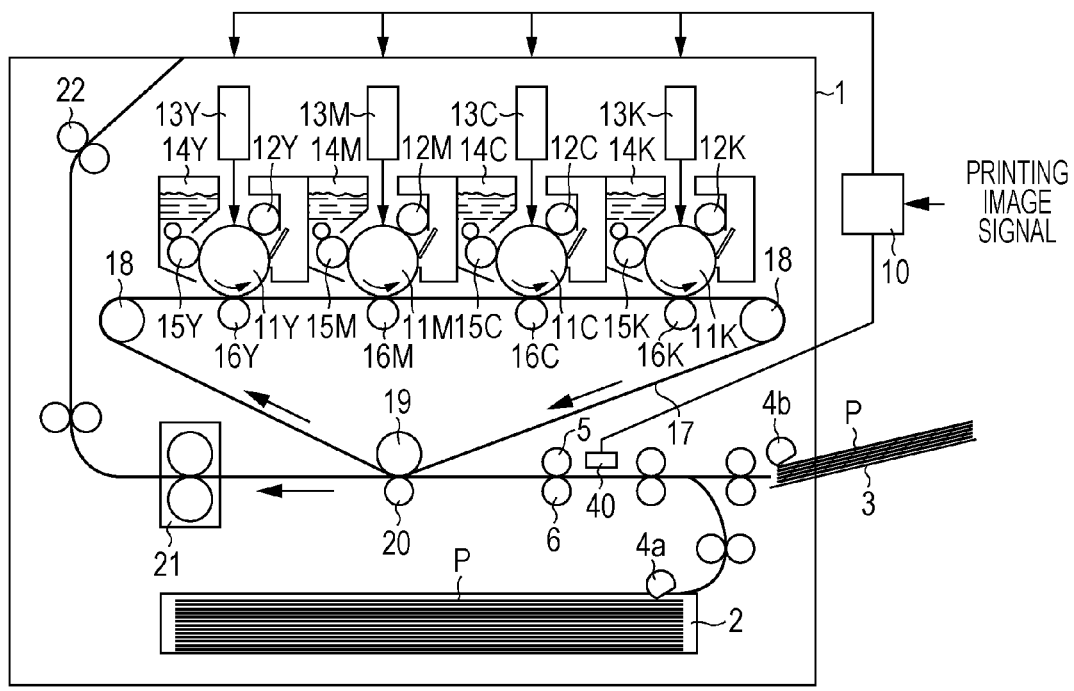
FIG. 6 is a schematic cross-sectional view of an image forming apparatus having the recording material detecting unit mounted thereon.

First of all, an image forming apparatus having a recording material detecting unit according to a first embodiment mounted thereon will be described. FIG. 6 is a schematic cross-sectional view of an image forming apparatus 1 having a recording material detecting unit 40 mounted thereon. Respective configurations of the image forming apparatus 1 will be given below. Reference numeral 2 designates a paper feed cassette in which a recording material P is stored. Reference numeral 3 designates a paper feed tray on which the recording material P is stored in stack. Reference numeral 4a designates a paper feed roller configured to feed the recording material P from the paper feed cassette 2. Reference numeral 4b designates a paper feed roller configured to feed the recording material P from the paper feed tray 3. Reference numeral 5 designates a conveying roller configured to convey the supplied recording material P, and reference numeral 6 designates an opposed conveying roller opposing the conveying roller 5. Reference numerals 11Y, 11M, 11C and 11K designate photoconductive drums, which respectively carry developers of yellow, magenta, cyan, and black. Reference numerals 12Y, 12M, 12C and 12K designate charging rollers as primary charging units configured to charge the photoconductive drums 11Y, 11M, 11C and 11K uniformly at a predetermined potential. Reference numerals 13Y, 13M, 13C and 13K are optical units configured to irradiates the photoconductive drums 11Y, 11M, 11C and 11K charged by the primary charging units with laser beams corresponding to image data of respective colors, and form electrostatic latent images.

Reference numerals 14Y, 14M, 14C, and 14K designate developing units configured to visualize the electrostatic latent images formed on the photoconductive drums 11Y, 11M, 11C and 11K. Reference numerals 15Y, 15M, 15C and 15K designate developer conveying rollers configured to feed developers within the developing units 14Y, 14M, 14C and 14K to portions opposing the photoconductive drums 11Y, 11M, 11C and 11K. Reference numerals 16Y, 16M, 16C, and 16K designate primary transfer rollers for respective colors configured to primarily transfer the toner images formed on the photoconductive drums 11Y, 11M, 11C and 11K. Reference numeral 17 designates an intermediate transfer belt configured to carry the primarily transferred toner images. Reference numeral 18 designates driving rollers configured to drive the intermediate transfer belt 17. Reference numeral 19 designates a secondary transfer roller configured to transfer the toner images formed on the intermediate transfer belt 17 to the recording material P, and reference numeral 20 designates an opposed secondary transfer roller opposing the secondary transfer roller 19. Reference numeral 21 designates a fixing unit configured to fuse and fix the toner image transferred to the recording material P while conveying the recording material P. Reference numeral 22 designates paper discharging rollers configured to discharge the recording material P after having subjected to the fixing by the fixing unit 21.

Subsequently, an image forming operation of the image forming apparatus 1 will be described. Printing data including a printing command and image information is entered from a host computer or the like, not shown, to the image forming apparatus 1. Then, the image forming apparatus 1 starts the printing operation, and the recording material P is fed from the paper feed cassette 2 or the paper feed tray 3 by the paper feed roller 4a or the paper feed roller 4b and is fed to a conveying path. The recording material P stops once at the conveying roller 5 and the opposed conveying roller 6 for synchronization with an image forming operation for forming an image on the intermediate transfer belt 17 and the timing of conveyance, and waits until the image formation is performed. Together with an operation to feed the recording material P, the photoconductive drums 11Y, 11M, 11C and 11K are charged by the charging rollers 12Y, 12M, 12C and 12K to a certain potential as the image forming operation. According to the entered printing data, the optical units 13Y, 13M, 13C and 13K perform scanning and exposure on the surfaces of the charged photoconductive drums 11Y, 11M, 11C and 11K with a laser beam to form electrostatic latent images thereon. In order to visualize the formed electrostatic latent images, development is performed by the developing units 14Y, 14M, 14C and 14K and the developer transfer rollers 15Y, 15M, 15C and 15K. The electrostatic latent images formed on the surfaces of the photoconductive drums 11Y, 11M, 11C and 11K are developed as toner images of respective colors by the developing units 14Y, 14M, 14C and 14K. The photoconductive drums 11Y, 11M, 11C and 11K are in contact with the intermediate transfer belt 17, and rotates synchronously with the rotation of the intermediate transfer belt 17. The developed respective toner images are transferred in sequence on the intermediate transfer belt 17 in an overlapped manner by the primary transfer rollers 16Y, 16M, 16C and 16K. Then, the secondary transfer is performed on the recording material P by the secondary transfer roller 19 and the opposed secondary transfer roller 20.

Subsequently, synchronously with the image forming operation, the recording material P is conveyed to the secondary transfer unit in order to be subject to a secondary transfer. The toner image formed on the intermediate transfer belt 17 is transferred to the recording material P by the secondary transfer roller 19 and the opposed secondary transfer roller 20. The toner image transferred on the recording material P is fixed by the fixing unit 21 composed of fixing rollers or the like. The recording material P subjected to fixation is discharged onto a paper discharge tray, not shown, by the paper discharge rollers 22, and the image forming operation is ended.

In the image forming apparatus 1 shown in FIG. 6, the recording material detecting unit 40 is arranged on the upstream side of the conveying roller 5 and the opposed conveying roller 6 and information reflecting the surface smoothness of the recording material P conveyed from the paper feed cassette 2 or the like is detected. Detection of the recording material P by the recording material detecting unit 40 is preformed after the recording material P is fed from the paper feed cassette 2 or the like into the image forming apparatus before being clamped between the conveying roller 5 and the opposed conveying roller 6. The detection of the recording material P may be performed while being clamped and conveyed between the conveying roller 5 and the opposed conveying roller 6. The reason why the detection of the recording material P is performed while conveying the recording material P is because the recording material detecting unit 40 employs a line sensor. It is also possible to employ an area sensor, stop the conveyance of the recording material P temporarily, receive reflected light from the surface of the recording material P, and pick up an image of the surface of the recording material P as a matter of course.

(Recording Material Detecting Unit)

Figure 1A:
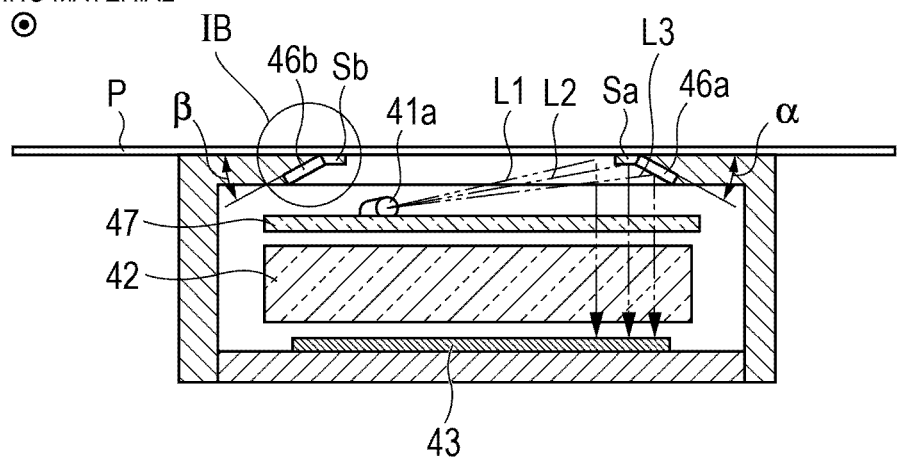
FIG. 1A is a cross-sectional view of a recording material detecting unit viewed from a downstream side of the direction of conveyance of a recording material.
Figure 1B:
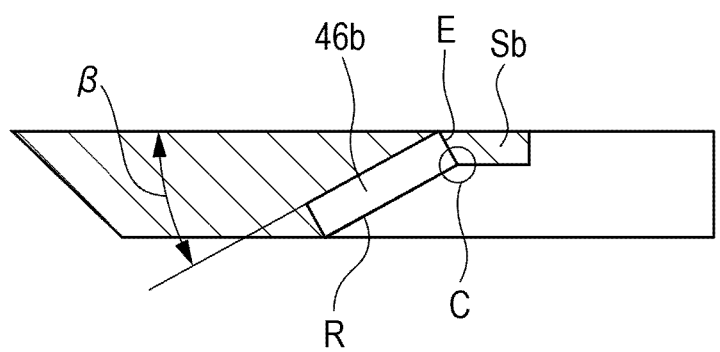
FIG. 1B is an enlarged view of a portion indicated by IB in FIG. 1A.
Figure 2:
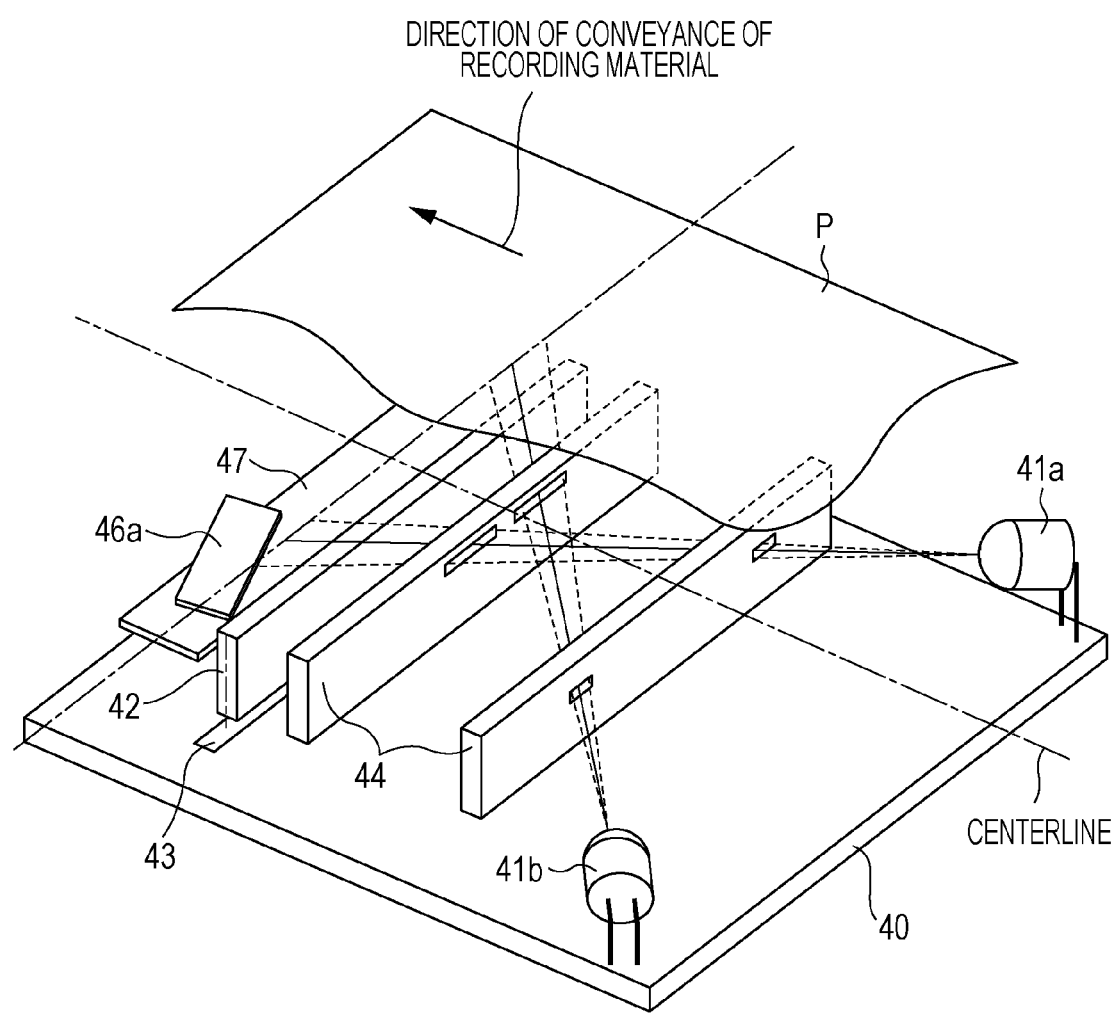
FIG. 2 is a perspective view of an interior of a recording material detecting unit.

FIG. 2 is a perspective view of an interior of the recording material detecting unit 40. FIG. 1A is a cross-sectional view of the recording material detecting unit 40 viewed from a downstream side in the direction of conveyance of the recording material. FIG. 1B is an enlarged view of a portion indicated by IB in FIG. 1A, that is, of a portion in the vicinity of the reference panel 46b.

The recording material detecting unit 40 includes light sources (package-type LEDs) 41a and 41b configured to irradiate the surface of a recording material P with light, an imaging lens 42 configured to form an image by the light reflected from the surface of the recording material P, and a light-receiving unit (line sensor) 43 configured to receive the light of the image formed by the imaging lens 42 and pick up the image. The light emitted from the light sources 41a and 41b is regulated by slits 44. Reference panels 46a and 46b are provided on the side of the light-receiving unit 43 with respect to the surface of the recording material P at ends of an area which is irradiated with light from the light sources 41a and 41b. The reference panels 46a and 46b are provided with reference surfaces R as irregular reflecting surfaces, and light from the light sources 41a and 41b is reflected from the reference surfaces R, respectively. The reflected light is passed through the imaging lens 42 and is received by the light-receiving unit 43, whereby the amount-of-light adjustment and the shading correction are performed, and the detecting conditions of the recording material detecting unit are controlled. In other words, the reference surfaces R of the reference panels 46a and 46b are planes which reflect reference reflected light for performing the amount-of-light adjustment and the shading correction to control the detecting conditions of the recording material detecting unit. Although illustration is omitted in FIG. 2, the reference panel 46b is provided so as to be in line symmetry with the reference panel 46a with respect to a centerline in FIG. 2 when viewed from the direction of a normal line of the surface of the recording material P.

Provided between the imaging lens 42 and the recording material P is a protecting member 47 configured to protect the imaging lens 42 from becoming dirty and allow passage of the reflected light from the recording material P therethrough. These members are supported within a unit body. In particular, the reference panels 46a and 46b are plate-shaped members, and are attached on a back surface of a portion guiding the conveyance of the recording material P with a double-faced adhesive material or the like.

Here, the light sources 41a and 41b are arranged so that not only the surface of the recording material P, but also the reference panels 46a and 46b are irradiated simultaneously with the light from the light sources 41a and 41b. Therefore, the reflected light reflected from the surface of the recording material P and the reflected light reflected from the reference surfaces R of the reference panels 46a and 46b may be received simultaneously by the light-receiving unit 43.

The longitudinal directions of the imaging lens 42 and the light-receiving unit 43 are arranged so as to be orthogonal to the direction of conveyance of the recording material P. Optical axes of the light sources 41a and 41b are arranged so as to be inclined by an angle of 45° with respect to the direction of conveyance of the recording material P and to intersect each other. The reference panels 46a and 46b are provided corresponding to the light sources 41a and 41b respectively, and are provided on both sides of part of the surface of the recording material P which reflects the light toward the light-receiving unit 43 in the direction parallel to the recording material P and orthogonal to the direction of conveyance of the recording material P. The reference panels 46a and 46b are provided on the side of the light-receiving unit 43 (inner side of the unit) with respect to the part of the surface of the recording material P which reflects the light toward the light-receiving unit 43 in the direction of the normal line of the surface of the recording material P. In other words, the interior of the recording material detecting unit 40 is configured to be line symmetry with respect to a centerline in FIG. 2 when viewed from the direction of the normal line of the surface of the recording material P.

Figure 3:
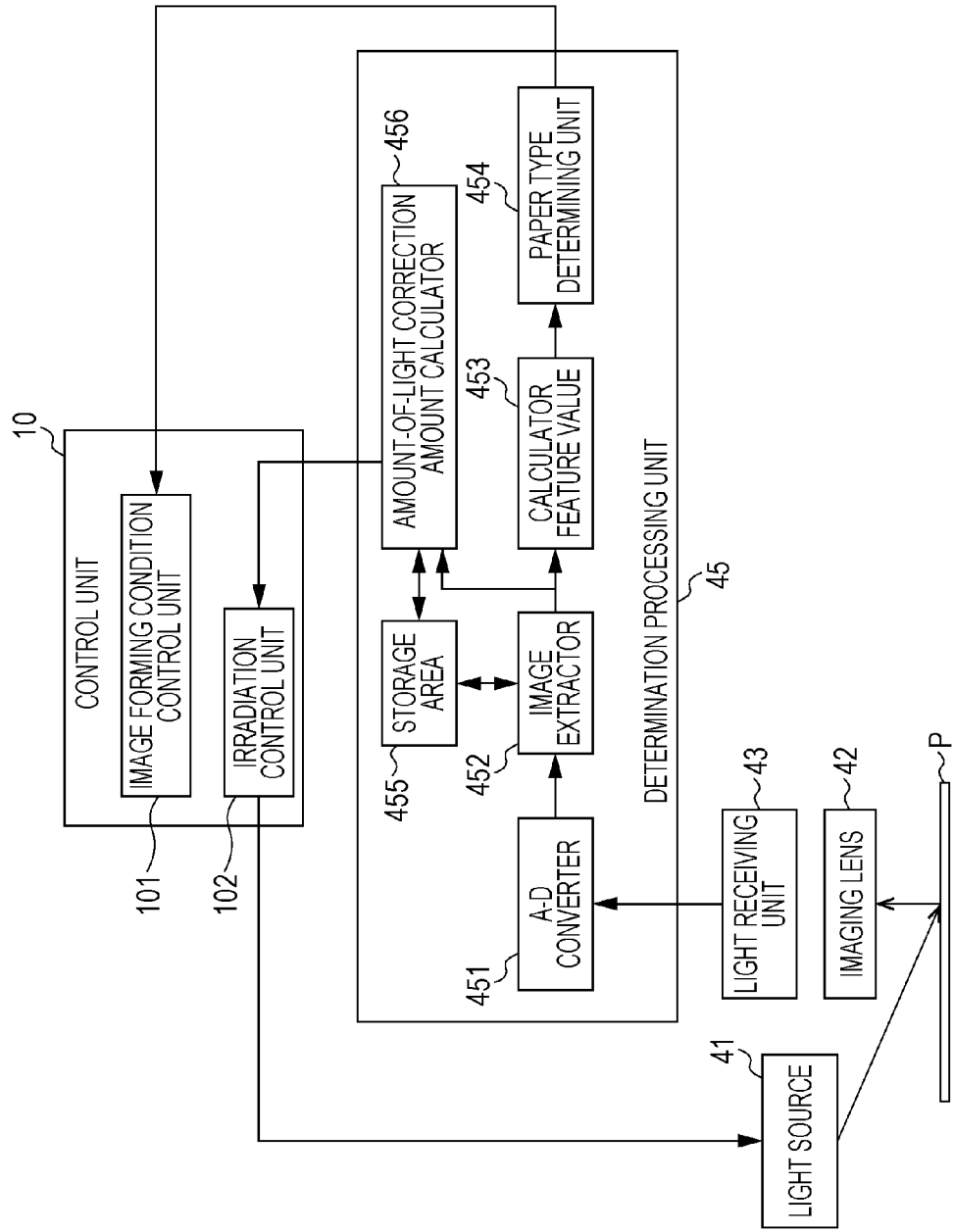
FIG. 3 is an operation control block diagram of the recording material detecting unit.

FIG. 3 is an operation control block diagram of the recording material detecting unit 40. The surface of the recording material P being conveyed is irradiated with light from the light sources 41a and 41b. The reflected light from the recording material P is received by the light-receiving unit 43 via the imaging lens 42, so that a surface image is picked up. A surface state of the recording material P such as roughness or the like is reflected on surface image on the recording material P. The light-receiving unit 43 produces an output of the picked up surface image on the recording material P to a determining and processing unit 45 as a detection device configured to detect information on the recording material P and determines the recording material P. The light-receiving unit 43 is a line sensor having a plurality of pixels aligned in the direction orthogonal to the direction of conveyance of the recording material P. Therefore, the determining and processing unit 45 converts the surface image of the recording material P received from the light-receiving unit 43 by an A-D converter 451, and obtains one line image orthogonal to the direction of conveyance of the recording material P. In this example, an 8-bit A-D conversion IC is used, and the A-D converter 451 produces outputs of numerical values from 0 to 255. In an image extractor 452 and a storage unit 455, the surface images of the received recording material P are pieced in the direction of conveyance to obtain a two-dimensional surface image.

On the basis of information such as range of effective image or the like stored in the storage area 455, extraction of the surface image to be used for determining the type of the recording material P is performed. At this time, the surface image is subjected to the shading correction in order to determine the type of the recording material P. Current values for controlling the light emission of the light sources 41a and 41b, target amount-of-light values required for adjusting the amount of light, dark current data when the light sources 41a and 41b are OFF and data on unevenness of amount of light when the light sources 41a and 41b are OFF used for correcting unevenness of amount of light are stored in the storage area 455. In addition, from the data on unevenness of amount of light when the light sources 41a and 41b are ON, a pixel range of data corresponding to the outputs from the reference panels 46a and 46b (the pixel range which receives the reflected light from the reference panels 46a and 46b) and the amount-of-light values thereof are stored. The pixel range of the data on the light sources 41a and 41b and the amount-of-light values thereof are also stored.

A feature value calculator 453 calculates a feature value of a paper type from the extracted surface image. A paper type determining unit 454 determines the paper type on the basis of the result of calculation calculated by the feature value calculator 453. An output of the result of determination by the paper type determining unit 454 is supplied to an image forming condition control unit 101 of a control unit (CPU) 10, where the image forming conditions are controlled on the basis of the result of determination.

The image forming conditions includes conditions such as a transfer voltage, the conveyance speed of the recording material P, and temperatures of a fixer. For example, if the paper type is determined to be rough paper as a result of the paper type determination, since fixing property is not as good as the image forming conditions for normal paper, control to make the conveyance speed of the recording material P slower to increase time used for the fixation by the fixing unit 21 or to increase the fixing temperature is performed.

Referring now to FIGS. 1A and 1B, the arrangement of the reference panels 46a and 46b and the configuration in the periphery of the reference panels 46a and 46b, which are characteristics of the present invention, will be described. In FIG. 1A, irradiated light irradiated from the light source 41a to the surface of the recording material P is shown in a double-dashed chain line represented by L1, irradiated light irradiated toward an end surface, which is not the reference surface R, of the reference panel 46a is shown in a double-dashed chain line represented by L2, and irradiated light irradiated on the reference surface R of the reference panel 46a is shown in a double-dashed chain line represented by L3. Since the light to be emitted from the light source 41b is the same as that from the light source 41a, illustration is omitted.

End surfaces E of the reference panels 46a and 46b and edge portions C between the reference surfaces R and the end surfaces E are covered with light-shielding portions Sa and Sb provided adjacent to the reference panels 46a and 46b on the inner sides of the recording material detecting unit 40 (the center side) with respect to the reference panels 46a and 46b. Therefore, light is prevented from being reflected from portions other than the reference surfaces R such as the end surfaces E of the reference panels 46a and 46b or the edge portions C and entering the light-receiving unit 43.

A case where the reference surfaces R are provided on the side of the light-receiving unit 43 (lower side in the drawing) with respect to the part of the surface of the recording material P which reflects the light toward the light-receiving unit 43 in the direction orthogonal to the surface of the recording material P will be described. In this case, if the reference surfaces R are arranged so as to overlap with the part of the surface of the recording material P which reflects the light toward the light-receiving unit 43, the reflected light from the surface of the recording material P cannot be received by the light-receiving unit 43. Therefore, it is necessary to arrange the reference surfaces R at positions except for the part of the surface of the recording material P which reflects the light toward the light-receiving unit 43 when viewed from the direction orthogonal to the surface of the recording material P. If the reference surfaces R are arranged under such conditions, the reference surfaces are arranged at a positions where the amount of light irradiated from the light sources 41a and 41b is small rather than the part of the surface of the recording material P which reflects the light toward the light-receiving unit 43. With such an arrangement of the reference panels 46a and 46b simply at the positions described above, it is difficult to secure the amount of light of the reflected light from the reference surfaces R received by the light-receiving unit 43. Therefore, in the first embodiment, the reference panels 46a and 46b are provided obliquely with respect to the surface of the recording material P so as to have inclinations α and β toward the light sources, respectively, when viewed from the direction of conveyance of the recording material P. Therefore, in the light directed from the light sources 41a and 41b on to the reference panels 46a and 46b, the proportion of the amount of light reflected from the reference surfaces R and entering the light-receiving unit 43 may be increased.

Figure 4:
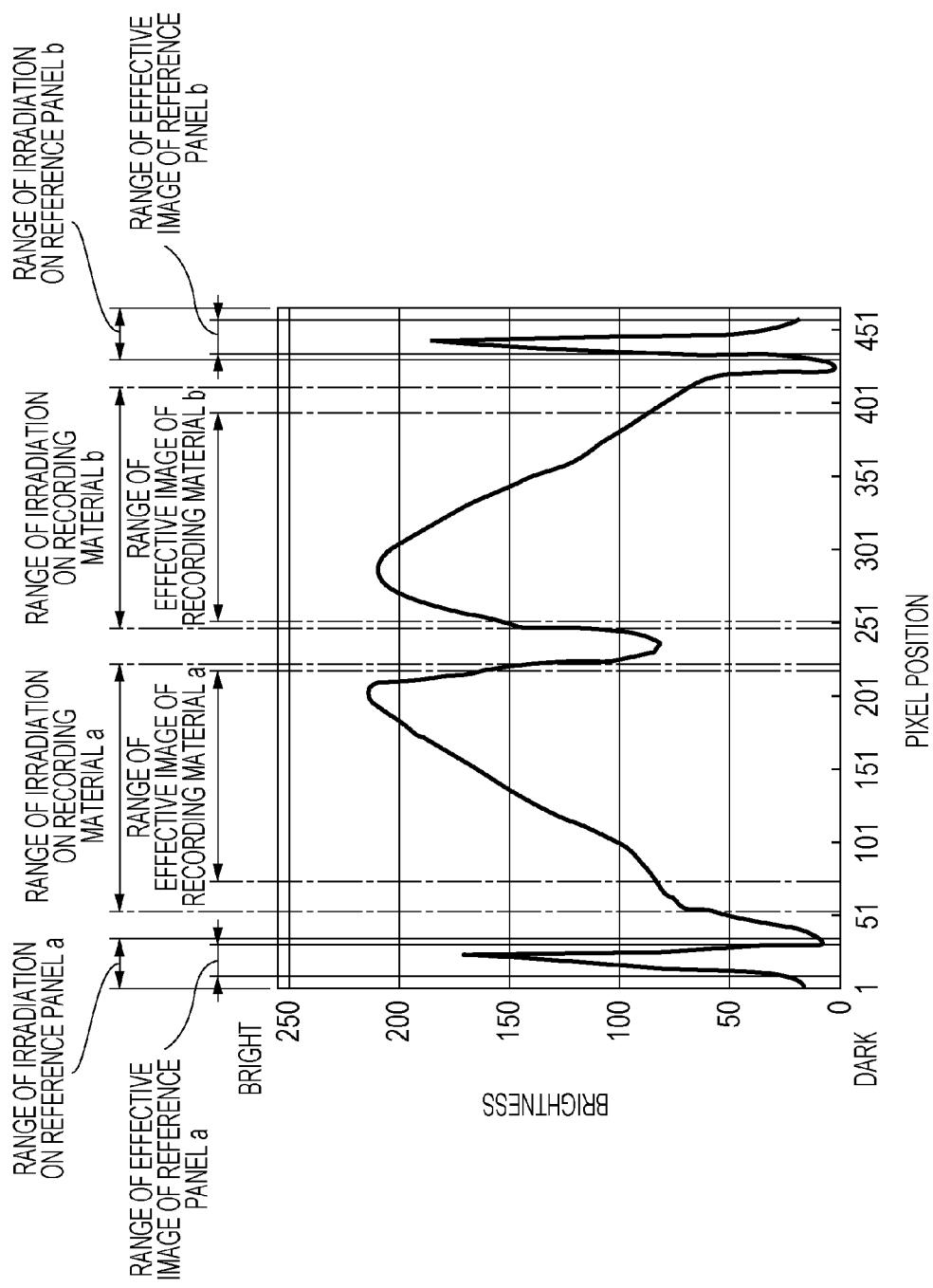
FIG. 4 is a chart showing a distribution of brightness (amount of light) of light received by a receiving unit.

FIG. 4 shows a distribution of brightness (amount-of-light distribution) of the light received by the light-receiving unit 43. A lateral axis represents positions on the light-receiving unit 43 corresponding to respective pixels, and a vertical axis represents brightness corresponding to the amount of light received by the respective pixels. The pixel position 1 corresponds to a pixel at a right end of the light-receiving unit 43 in FIG. 1A, and the corresponding pixel on the light-receiving unit 43 in FIG. 1A goes leftward with an increase in the numerical value of the pixel position.

Ranges of irradiation on recording material a and b indicate ranges of a recording material surface image to be acquired (pixel ranges that receive the reflected light from the surface of the recording material P) for being used for determining the type of the recording material P on the basis of the brightness distribution of light irradiated from light sources 41a and 41b. The ranges of irradiation on the recording material a and b are set in advance. In these ranges of irradiation on the recording material a and b, ranges having a brightness exceeding a predetermined threshold value are defined as ranges of effective image on the recording material, and the surface images within these ranges of effective image on the recording material are used for determination of the type of the recording material P. In the first embodiment, coupling with a minimum duration required for the light-receiving unit 43 to receive the picked up image (to receive light) and the rate of irregular reflection, the threshold value of the brightness is set to 180 in a case where the strength of brightness have 256 tones (0(dark) to 255(bright)). In this manner, the reason why the range of effective image of the recording material from the ranges of irradiation on the recording material a and b is for preventing the pixel range used for the determination of the type of the recording material P from changing depending on the accuracy of the mounting position of the light-receiving unit 43.

The ranges of irradiation on the reference panel a and b represent areas from which the surface information on the reference surfaces R of the reference panels 46a and 46b respectively (the pixel ranges that receive the light reflected from the reference panels 46a and 46b) are acquired. The ranges of effective image on the reference panel a and b are areas used for calculating the amount of reflected light from the reference surfaces R.

As described above, the reference panels 46a and 46b are provided obliquely with respect to the surface of the recording material P so as to have inclinations α and β toward the light sources, respectively, when viewed from the direction of conveyance of the recording material P. Therefore, peaks having a large amount of light are obtained in the ranges of effective image of the reference panel, and hence it is understood that a large amount of light is obtained in these pixel ranges. When adjusting the amount of emitted light from LEDs as the light sources 41a and 41b, if the amount of reflected light from the reference surfaces R of the reference panels is on the order of ½ the average amount of light obtained on the line sensor pixels, a amount of light sufficient for executing a amount-of-light adjustment with high degree of accuracy is obtained.

More specifically, the sizes to achieve installation of the reference panels corresponding to a recording material irradiating window and installation at the end portion are such that the length of the reference panel is on the order of 4 to 5 mm and the thickness of resin portion which constitutes the recording material irradiating window is on the order of 2 to 3 mm. Therefore, the allowable height of a space which allows the reference panels to be installed obliquely within a range which does not cause any optical problem is on the order of 0.8 to 1.5 mm. To exemplify the further detailed angles of inclination α and β, the angle of inclination is approximately 11° if the length is 5 mm and the height of inclination is 1 mm and, in the same manner, the angle of inclination is approximately 20° if the length is 4 mm and the angle of inclination is 1.5 mm. If the angles of inclination α and β are larger, the reflected light from the reference panels may enter the range of effective image of the recording material, which may affect the accuracy of determination.

There are a pixel range having a sagged amount of light between the range of radiation on the reference panel and the range of irradiation on the recording material. It is because the light-shielding portions Sa and Sb are members formed of black resin. In other words, by employing block color for the light-shielding portions Sa and Sb, the amount of light reflected from the light-shielding portions Sa and Sb and entering the light-receiving unit 43 is reduced in comparison with the reflected light from the reference surfaces R or the surface of the recording material P. In other words, the average amount of light per unit pixel of light reflected from the light-shielding portions Sa and Sb and received by the light-receiving unit 43 is smaller than the average amount of light per unit pixel of light reflected from the surface of recording material and received by the light-receiving unit 43. Also, in other words, the average amount of light per unit pixel of light reflected from the light-shielding portions Sa and Sb and received by the light-receiving unit 43 is smaller than the average amount of light per unit pixel of light reflected from the reference surfaces R and received by the light-receiving unit 43. In other words, the light-shielding portions Sa and Sb have a low reflecting surface having an average amount of light per unit pixel of light received by the light-receiving unit 43 smaller than those of the surface of the recording material P and the reference surfaces R. Since the surfaces of the light-shielding portions Sa and Sb are black, the surfaces are low-reflecting surface in the first embodiment. However, the surfaces of the light-shielding portions Sa and Sb may be coated with a reflection-resistant coating.

Since the pixel position of the light-receiving unit 43 having a sagged amount of light can be detected clearly, it is possible to detect the pixel positions having the sagged amount of light and determine the width of the range of effective image of the recording material simply with high degree of accuracy with reference to the pixel positions having the sagged amount of light.

The light-shielding portions Sa and Sb covers the end surfaces E and the edge portions C of the reference panels 46a and 46b. Therefore, the light from the light sources 41a and 41b is prevented from being reflected from the end surfaces E and the edge portions C, so that the noise caused by the light reflected from portions other than the reference surfaces R of the reference panels 46a and 46b is inhibited. Therefore, a range which could not used as the range of effective image of the recording material due to the presence of influence of the noise caused by the light reflected from the portions other than the reference surfaces R in the related art can now be used as the range of effective image of the recording material. Since the influence of the noise caused by the light reflected from the portions other than the reference surfaces R is restrained, the position having the sagged amount of light described above can be detected further clearly.

Although the package-type LEDs are used as the light source in the first embodiment, chip-type LEDs may also be used. Although the line sensor are used as the light-receiving unit in the first embodiment, an area sensor may be used. The light from the light sources may be caused to pass through light guides before being directed to the recording material P and the reference panels 46a and 46b.

In this manner, according to the first embodiment, the reference panels 46a and 46b are provided obliquely with respect to the surface of the recording material P so as to have inclinations α and β toward the light sources respectively when viewed from the direction of conveyance of the recording material P. Therefore, a large amount of light is obtained in the range of effective image of the reference panel, and hence a amount-of-light adjustment with high degree of accuracy can be executed and, consequently, the accuracy of the recoding material determination may be improved.

Also, with the provision of the light-shielding portions Sa and Sb having low-reflection surfaces, a range having a sagged amount of light is generated on the pixels of the line sensor 43 between the range of irradiation on the recording material and the range of irradiation on the reference panel. The amount of light in this range is smaller in comparison with the amounts of light in these ranges. Then, with reference to the position with the sagged amount of light, the width of the range of effective image of the recording material can be determined simply with high degree of accuracy and, consequently, the range which could not be used as the range of effective image of the recording material in the related art can now be used as the range of effective image of the recording material. Therefore, improvement of the accuracy of determination of the recording material is achieved.

Also, according to the present invention, by covering the end surfaces E or the edge portions C with the light-shielding portions Sa and Sb, the noise caused by the light reflected from the portions other than the reference surfaces R is inhibited, so that the range which could not used as the range of effective image of the recording material due to the presence of influence of the noise caused by the light reflected from the portions other than the reference surfaces R in the related art can now be used as the range of effective image of the recording material. Therefore, if the same light-receiving unit is used, the wider range of effective image of the recording material than in the related art can be obtained, so that the accuracy of determination of the recording material may be improved as a result.

Second Embodiment

Subsequently, a second embodiment of the present invention will be described. The same parts as the first embodiment are designated by the same reference numerals and the description will be omitted.

Figure 5:
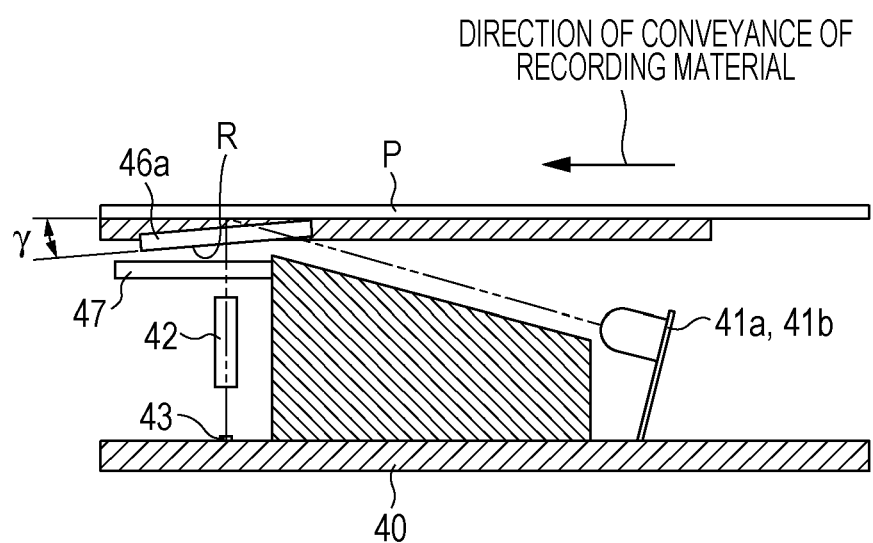
FIG. 5 is a cross-sectional view of the recording material detecting unit viewed from a direction parallel to the surface of a recording material and orthogonal to the direction of conveyance of the recording material.

FIG. 5 is a cross-sectional view of the recording material detecting unit 40 viewed from a direction parallel to the surface of a recording material P and orthogonal to the direction of conveyance of the recording material. The second embodiment shows a state in which the reference panels 46a and 46b are inclined with respect to the surface of the recording material P to provide the reference surfaces R with an inclination gamma γ on the side of the light sources 41a and 41b from the direction parallel to the surface of the recording material and orthogonal to the direction of conveyance of the recording material P. Even when the reference surfaces R are inclined, the amount of light within the range of irradiation on the reference panel can be increased and approximately ½ the average amount of light obtained on the sensor pixels can be secured as the amount of reflected light from the reference panels. Therefore, when adjusting the amount of emitted light from the LED as the light sources, a sufficient amount of light is obtained, and hence the amount-of-light adjustment with high degree of accuracy can be executed.

It is also possible to provide the reference surfaces R with inclinations α and β toward the light sources 41a and 41b when viewed from the direction of transport of the recording material P as in the first embodiment and, in addition, with an inclination of γ toward the light sources 41a and 41b when viewed in the direction parallel to the surface of the recording material and orthogonal to the direction of transport of the recording material P.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A recording material detection apparatus comprising:
   a light source configured to irradiate a recording material with light;
   a reference surface to be irradiated with light from the light source, the reference surface being arranged on the side of the light source with respect to a recording material in a direction orthogonal to the surface of the recording material; and
   a light-receiving unit having a plurality of pixels and configured to receive light reflected from a surface of the recording material irradiated with the light from the light source and the reference surface,
   wherein the reference surface is inclined with respect to a part of the surface of the recording material, which reflects the light toward the light-receiving unit, such that the reference surface becomes closer to the light-receiving unit as it becomes farther away from the light source in an aligned direction of the plurality of pixels.

2. The recording material detection apparatus according to claim 1, wherein the reference surface is arranged at a position where the amount of light irradiated from the light source is smaller than the part of the surface of the recording material, which reflects the light toward the light-receiving unit.

3. The recording material detection apparatus according to claim 1 further comprising:
   a detecting device configured to detect information relating to a surface state of the recording material on the basis of the light reflected from the surface of the recording material and received by the light-receiving unit, the detecting device controlling conditions for detection of the information relating to the surface state of the recording material on the basis of the light reflected from the reference surface and received by the light-receiving unit.

4. The recording material detection apparatus according to claim 1, wherein the reference surface is inclined with respect to a conveyance direction of the recording material such that the reference surface becomes closer to the light-receiving unit as it becomes farther away from the light source in the conveyance direction of the recording material.

5. The recording material detection apparatus according to claim 1 further comprising:
   an another reference surface to be irradiated with light from the light source, the another reference surface being arranged on the side of the light source with respect to the recording material in the direction orthogonal to the surface of the recording material,
   wherein the light-receiving unit receives light reflected from the another reference surface,
   wherein the another reference surface is inclined with respect to the part of the surface of the recording material, which reflects the light toward the light-receiving unit, such that the another reference surface becomes closer to the light-receiving unit as it becomes farther away from the light source in the aligned direction of the plurality of pixels, and
   wherein the part of the surface of the recording material, which reflects the light toward the light-receiving unit, is arranged between the reference surface and the same one of the other reference surfaces in the aligned direction of plurality of pixels.

6. A recording material detection apparatus comprising:
   a light source configured to irradiate a recording material with light;
   a reference surface to be irradiated with light from the light source, the reference surface being arranged on the side of the light source with respect to a recording material in a direction orthogonal to the surface of the recording material; and
   a light-receiving unit having a plurality of pixels and configured to receive light reflected from a surface of the recording material irradiated with the light from the light source and the reference surface,
   wherein the reference surface is inclined with respect to an aligned direction of the plurality of pixels such that the reference surface becomes closer to the light-receiving unit as it becomes farther away from the light source in the aligned direction of the plurality of pixels.

7. The recording material detection apparatus according to claim 5, wherein the reference surface is arranged at a position where the amount of light irradiated from the light source is smaller than a part of the surface of the recording material, which reflects the light toward the light-receiving unit.

8. The recording material detection apparatus according to claim 6 further comprising:
   a detecting device configured to detect information relating to a surface state of the recording material on the basis of the light reflected from the surface of the recording material and received by the light-receiving unit, the detecting device controlling conditions for detection of the information relating to the surface state of the recording material on the basis of the light reflected from the reference surface and received by the light-receiving unit.

9. The recording material detection apparatus according to claim 6, wherein the reference surface is inclined with respect to a conveyance direction of the recording material such that the reference surface becomes closer to the light-receiving unit as it becomes farther away from the light source in the conveyance direction of the recording material.

10. The recording material detection apparatus according to claim 6 further comprising:
    an another reference surface to be irradiated with light from the light source, the another reference surface being arranged on the side of the light source with respect to the recording material in the direction orthogonal to the surface of the recording material,
    wherein the light-receiving unit receives light reflected from the another reference surface,
    wherein the another reference surface is inclined with respect to the aligned direction of the plurality of pixels such that the another reference surface becomes closer to the light-receiving unit as it becomes farther away from the light source in the aligned direction of the plurality of pixels, and
    wherein the part of the surface of the recording material, which reflects the light toward the light-receiving unit, is arranged between the reference surface and the another reference surface in the aligned direction of the plurality of pixels.

11. An image forming apparatus configured to form an image on a recording material comprising:
    a light source configured to irradiate a recording material with light;

a reference surface to be irradiated with light from the light source, the reference surface being arranged on the side of the light source with respect to a recording material in a direction orthogonal to the surface of the recording material;

a light-receiving unit having a plurality of pixels and configured to receive light reflected from a surface of the recording material irradiated with the light from the light source and the reference surface;

a detecting device configured to detect information relating to a surface state of the recording material on the basis of the light reflected from the surface of the recording material and received by the light-receiving unit, the detecting device controlling conditions for detection of the information relating to the surface state of the recording material on the basis of the light reflected from the reference surface and received by the light-receiving unit; and a control unit configured to control conditions for image formation on the recording material on the basis of an output from the detecting device, wherein the reference surface is inclined with respect to a part of the surface of the recording material, which reflects the light toward the light-receiving unit, such that the reference surface becomes closer to the light-receiving unit as it becomes farther away from the light source in an aligned direction of the plurality of pixels.

12. The image forming apparatus according to claim 11, wherein the reference surface is arranged at a position where the amount of light irradiated from the light source is smaller than the part of the surface of the recording material, which reflects the light toward the light-receiving unit.

13. The image forming apparatus according to claim 11, wherein the reference surface is inclined with respect to a conveyance direction of the recording material such that the reference surface becomes closer to the light-receiving unit as it becomes farther away from the light source in the conveyance direction of the recording material.

14. The image forming apparatus according to claim 11 further comprising:

an another reference surface to be irradiated with light from the light source, the another reference surface being arranged on the side of the light source with respect to the recording material in the direction orthogonal to the surface of the recording material, wherein the light-receiving unit receives light reflected from the another reference surface, wherein the another reference surface is inclined with respect to the part of the surface of the recording material, which reflects the light toward the light-receiving unit, such that the another reference surface becomes closer to the light-receiving unit as it becomes farther away from the light source in the aligned direction of the plurality of pixels, and wherein the part of the surface of the recording material, which reflects the light toward the light-receiving unit, is arranged between the reference surface and the another reference surface in the aligned direction of the plurality of pixels.

15. An image forming apparatus configured to form an image on a recording material comprising:

a light source configured to irradiate a recording material with light;

a reference surface to be irradiated with light from the light source, the reference surface being arranged on the side of the light source with respect to a recording material in a direction orthogonal to the surface of the recording material;

a light-receiving unit having a plurality of pixels and configured to receive light reflected from a surface of the recording material irradiated with the light from the light source and the reference surface;

a detecting device configured to detect information relating to a surface state of the recording material on the basis of the light reflected from the surface of the recording material and received by the light-receiving unit, the detecting device controlling conditions for detection of the information relating to the surface state of the recording material on the basis of the light reflected from the reference surface and received by the light-receiving unit; and a control unit configured to control conditions for image formation on the recording material on the basis of an output from the detecting device, wherein the reference surface is inclined with respect to an aligned direction of the plurality of pixels such that the reference surface becomes closer to the light-receiving unit as it becomes farther away from the light source in the aligned direction of the plurality of pixels.

16. The image forming apparatus according to claim 15, wherein the reference surface is arranged at a position where the amount of light irradiated from the light source is smaller than a part of the surface of the recording material, which reflects the light toward the light-receiving unit.

17. The image forming apparatus according to claim 15, wherein the reference surface is inclined with respect to a conveyance direction of the recording material such that the reference surface becomes closer to the light-receiving unit as it becomes farther away from the light source in the conveyance direction of the recording material.

18. The image forming apparatus according to claim 15 further comprising:

an another reference surface to be irradiated with light from the light source, the another reference surface being arranged on the side of the light source with respect to the recording material in the direction orthogonal to the surface of the recording material, wherein the light-receiving unit receives light reflected from the another reference surface, wherein the another reference surface is inclined with respect to the aligned direction of the plurality of pixels such that the same one of the other reference surfaces becomes closer to the light-receiving unit as it becomes farther away from the light source in the aligned direction of the plurality of pixels, and wherein the part of the surface of the recording material, which reflects the light toward the light-receiving unit, is arranged between the reference surface and the another reference surface in the aligned direction of the plurality of pixels.

* * * * *